United States Patent [19]
Ross

[11] Patent Number: 5,480,297
[45] Date of Patent: Jan. 2, 1996

[54] APPARATUS FOR PRECISION MANUFACTURE

[75] Inventor: Anselmo Ross, Hialeah, Fla.

[73] Assignee: Injection Footwear Corp, Miami, Fla.

[21] Appl. No.: 322,699

[22] Filed: Oct. 13, 1994

[51] Int. Cl.$^6$ .................................................... B23B 3/00
[52] U.S. Cl. ..................... 425/119; 425/129.2; 425/423; 425/453; 425/DIG. 201; 156/500
[58] Field of Search ................................ 425/119, 129.2, 425/423, DIG. 201, 453; 264/259; 156/500

[56] References Cited

U.S. PATENT DOCUMENTS

| | | | |
|---|---|---|---|
| 3,496,608 | 2/1970 | Eldred et al. | 425/129.2 |
| 3,667,883 | 6/1972 | Ludwig et al. | 425/119 |
| 3,709,973 | 1/1973 | Malby | 425/119 |
| 4,123,493 | 10/1978 | Schilke et al | 425/119 |
| 4,302,416 | 11/1981 | Rudolf et al. | 425/119 |

*Primary Examiner*—Robert J. Warden
*Assistant Examiner*—Hien Tran

[57] ABSTRACT

An apparatus for the manufacture of goods wherein a component of such goods comprises a softgoods fabricated from a natural or synthetic fabric-like component, such as leather, nylon or urethane, and a component thereof that is injection molded relative to the fabric-like component resulting in the formation of an essentially complete, permanent and uniform seal therebetween. This improvement in the manufacturing process is the result, in part, of the modification of the apparatus used in such manufacture by providing an improved masking system for the precision application of an adhesive to a delimited area of the softgoods.

6 Claims, 8 Drawing Sheets

APPARATUS FOR PRECISION MANUFACTURE

BACKGROUND OF THE INVENTION

1. Field of the Invention

This invention is directed to an apparatus, to a method of manufacture and to an article of manufacture. More specifically, this invention is directed to a semi-automated apparatus and method for the manufacture of softgoods (e.g. footwear) involving injection molding of one or more components thereof. The softgoods resulting from such process are of a consistently high quality and appearance; and, the union or bond between the injection molded component and the non-injection molded component is both aesthetically attractive and forms an essentially permanent and complete seal therebetween.

2. Description of the Prior Art

In the manufacture of softgoods, such as footwear having injection molded soles, the process generally involves preforming a footwear upper from leather, canvas or a synthetic material; placement of the upper onto a foot form (also "last") of the appropriate size; securing the upper on the last by a drawstring-like cord which "ties" the sole face of an unfinished upper firmly to the last; placement of the last and upper in operative relation to the sole mold so as to extend at least a portion of the upper into the sole mold cavity; closing the mold so as to clamp the mold onto the last and the upper; and, injection of a plastic resin into the sole mold cavity. Upon setting of the resin, the mold is separated and, thereafter, the finished footwear removed from the last. The foregoing process is preferably performed on a carousel-like apparatus wherein each of the sequential operations in the manufacture is timed to the injection molding cycle and a completed manufacturing cycle takes at least one, and preferably two, complete revolutions of the carousel to allow adequate time for the setting of the resin in the mold before opening of the mold and the removal of the finished footwear from the last. In order to accommodate the continuous manufacture of footwear on this style of equipment, each of the workstations is provided with support that can accommodate two lasts, and such support pivots in respect to the rotating platform so as to position a last at a given workstation relative to a workman. The rotation of the last support, thus, provides for the continuous operation of the equipment while permitting additional time for the sole of the completed footwear to set in the mold cavity before the removal thereof.

As is appreciated by the prior art, the foregoing process is generally modified or adjusted to accommodate the different materials used in the manufacture of such footwear, specifically, to insure the complete and essentially uniform bonding of the upper and the injection molded sole. Where for example, the sole is injection molded from PVC (polyvinyl chloride or an analog thereof) the bonding of the sole and the upper is accomplished without any special processing or accessory materials (bonding agents, adhesives, etc.). More specifically, the bonding of the PVC sole to the upper is apparently independent of material choice for the upper, and essentially complete and uniform bonding therebetween is effected where the upper is fabricated from a natural material, such as leather, or a synthetic material, such as vinyl. Injection molded PVC soles are acceptable for the less expensive types of footwear, however, thermosetting plastic rubber compounds (also herein referred to a "TPR") are preferable materials for injection molded soles as providing more comfort and a more attractive finished product. Unfortunately, the characteristic bonding properties of TPR compounds and the footwear upper require that an additional bonding agent be applied to the upper prior to injection molding of the sole to insure complete and essentially uniform adhesion of the upper to the sole in the finished goods. In the intermediate step of applying the bonding agent to the upper prior to placement of the sole mold in operative relation to the upper and the last, a mask must be used to insure that excess bonding agent is not misapplied to the upper so as to visibly detract from the appearance of the footwear upon the completion of the injection molding of the sole. Typically, this mask is sized appropriately to the operation for which it is intended and generally hand-held in place while the bonding agent applied with a brush or spray applicator to the upper. Because this intermediate step in the manufacturing process is generally performed manually and thus otherwise imprecise, it is subject to operator error and produces a significant number of blemished footwear that either require "dressing" of the blemish or, if irremediable, discarding the blemished item.

In an effort to add precision to this process and thereby minimize the occurrence of misapplication of bonding agent, or the application of excess binding agent, a variety of make-shift devices have been tried and rejected. More specifically, past efforts at automating the placement of a mask in relation to the upper have generally been inadequate as providing an ineffective seal between the upper and the mask, thus, allowing excess bonding agent to continue to cause blemishes in the finished footwear; and, alternatively, where effective sealing has been attempted between the mask and the upper, by automation of the masking process, such process has all to often resulted in increased risk of injury to the individuals operating such equipment because of inadvertent place mere of a hand or finger in the powered masking device, thereby causing serious injury. Accordingly, there has and continues to be a need to provide improved equipment and techniques for automating the manufacture of footwear, specifically footwear produced with injection molded soles formed from thermosetting plastic rubber compounds.

OBJECTS OF THE INVENTION

Accordingly, it is the object of this invention to remedy the above as well as related deficiencies in the prior art.

More specifically, it is the principal object of this invention to provide an improved apparatus for the precision masking of footwear uppers to prevent the misapplication of bonding agents and adhesive to such uppers in the course of their manufacture.

It is another object of the invention to provide a semi-automated apparatus for the precision placement of a mask relative to an upper to prevent the application of excess bonding agent or adhesive to an upper prior to injection molding of a sole relative to said upper.

It is yet another object of this invention to provide a semi-automated apparatus for the precision placement of the mask relative to the upper so as to limit the placement of the bonding agent or adhesive to the exact contour of the mold.

It is still yet another object of this invention to provide a semi-automated apparatus for the precision placement of a mask relative to an upper whereby such apparatus is activated by an operator at the time of engagement of the mask.

It is a further object of this invention to provide a semi-automated apparatus for the precision placement of a mask relative to an upper whereby the mask forms an essentially complete barrier to prevent the misapplication of bonding agent or adhesive to the upper.

It is yet a further object of this invention to provide a semi-automated apparatus for the precision placement of a mask relative to an upper so as to provide an essentially continuous guide for the application of bonding agent or adhesive to the upper and thereby creating an essentially uniform and complete bond between such upper and injection molded sole.

Additional objects of this invention include the provision of a method for the manufacture of footwear with the semi-automated apparatus of this invention and the footwear produced thereby.

SUMMARY OF THE INVENTION

The above and related objects are achieved by providing an improvement to an apparatus for the manufacture of footwear wherein a sole is formed on an upper of such footwear by injection molding of a resin compound relative to suit upper and, in the process, the formation of an essentially complete, permanent and uniform seal between the upper and the injection molded sole. This, improvement in the manufacturing process is the result, in part, of the modification of the apparatus used in such manufacture by providing an improved masking system for the precision application of an adhesive to a delimited area of the upper. The precision application of adhesive is achieved through the use of a power driven armature which includes a supporting frame and a two piece, or split, mask supported within the frame. This armature is preferably integrated into at least one of the workstations of an apparatus so as to sequentially position the armature at such workstation. in operative relation to an unfinished upper. Upon movement of the armature into proximate relationship to the unfinished upper, the operator at the workstation (15) activates the controls on the armature to effect the sealing engagement of the mask relative to the unfinished upper. The engagement of the armature controls, described in detail herein, requires the operator to use both of his hands and thereby insures the operator is out of harm's way upon the power engagement of the mask with the upper. Once the mask is in place and a bonding agent or adhesive applied to the upper in the delimited area permitted by the mask, the operator once again activates the controls on the armature. The mask and the upper are then disengaged and the carousel rotated to effect placement of another workstation (15) relative to the operator. The upper, specifically the adhesive bearing surface thereof, is thereafter positioned relative to an injection molding module were it is lowered into a cavity, defined by the injection molding station, and the sole injection molded relative thereto. The positioning of the upper relative to the mold cavity is at least coincident with the extent of application of bonding agent thereto so as to provide an essentially uniform and complete bond between the upper and the injection molded sole in the finished goods. Moreover, because the bonding agent is limited in its application to the portion of the upper that is bonded to the sole, there are no visible traces of bonding agent subsequent to molding of the sole to cause unsightly blemishes that need to be removed for an acceptable product, or if incapable of removal, that the footwear be discarded.

In the preferred configuration of the foregoing improvement, the mask is split in half along a plane that corresponds to a line running from the toe to the heel of the footwear. Each half of the mask is supported within a track of a frame that is integrated with the end of an armature; and, each half thereof is operatively connected to a power driven mechanism (e.g. solenoid). Prior to the placement and engagement of the mask and the upper, each half of the mask is maintained at a distance from the other. Upon activation of the power driven mechanism supporting each half of the mask, the individual sections of the mask are caused to move relative to the other within the frame of the armature. When the mask is placed in operative relation to an upper in the course of footwear manufacture, the controls of the armature are activated by an operator at the appropriate station and each of the halves of the mask is caused to engage an upper and thereby create an effective barrier to inadvertent application of excess bonding agent or adhesive. Once the bonding agent or adhesive has been applied to the delimited area of the upper permitted by the mask, the operator once again activates the armature controls and disengages the mask from the upper. The amount of bonding agent or adhesive applied to the upper is limited by the mask to the portion of the upper that is to be bonded to the injection molded sole. Accordingly, upon completion of the injection molding of the sole to the upper, virtually all of the bonding agent or adhesive is captured by the injection molded sole, creating a finished product which is both aesthetically attractive and physically sound.

DETAILED DESCRIPTION OF THE INVENTION INCLUDING PREFERRED EMBODIMENTS

For ease of understanding and illustration, this manufacturing process is herein defined in reference to footwear manufacture wherein the footwear (also "finished goods") comprises a pre-formed upper and an injection molded sole. It is assumed, for the purposes of this illustration, that in the course such fabrication of the footwear, the injection molded sole is formed relative to the upper and incorporates a portion thereof in the course of the injection molding process. It is further assumed for the purposes of this illustration that the injection molding compound used in this manufacturing process is a thermosetting plastic rubber (TPR) and, thus, the intrinsic physical and/or chemical properties of such resin is insufficient to create a permanent union or bond between the upper and the sole without some additional agent (e.g. adhesive) being introduced in the manufacturing cycle to enhance the creation of a uniform and essentially permanent bond therebetween. This invention provides a semi-automated means for precision placement of a mask relative to an upper so as to define a delimited area on the upper for the application of a bonding agent thereto.

As illustrated in FIGS. 1–4, the manufacturing equipment incorporating this invention is designed for the semi-automated fabrication of footwear comprising an upper (17) (that is generally manually fabricated) and one or more injection molded component parts. In the preferred embodiments of this invention illustrated in FIG. 1, such equipment comprises a plurality of subassemblies including a fixed or stationery platform (10) having a plurality of workstations (15), a rotating carousel (12), more fully described hereinafter and an injection molding module (14). The carousel assembly (12) is further characterized and provided with a plurality of lasts or foot forms (16) for support and sequential movement of a workpiece, or footwear upper, (17) from one station thereof to another in accordance with a defined operating cycle.

In the perspective views of this apparatus, the stationary platform (10) comprises a base (11) having a central post (13) equipped with a power drive assembly (not shown) for movement of a rotating carousel (12) for movement of a workpiece (17) from one workstation (15) to another, at least one workstation (15) having a supply of unfinished goods (not shown), at least one workstation (15) comprising a masking system (16') having an articulating armature (19) for precision placement of a mask (20) relative to a workpiece (17), at least one module (14) for injection molding (FIG. 6) of a sole relative to a workpiece (17) and a control module (not shown) for sequencing the movement of the workpiece upon the carousel (12) from one station to another.

Figure 1:
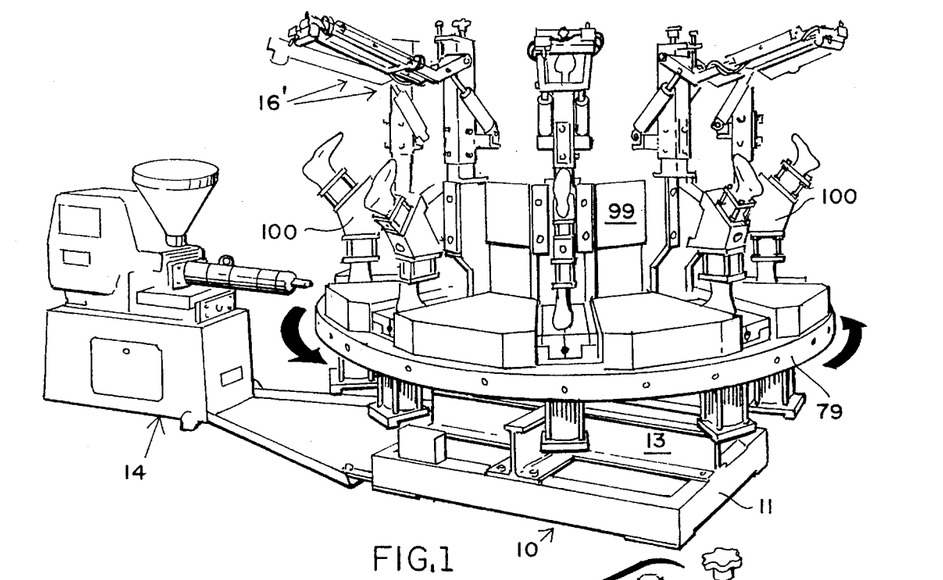
FIG. 1 is an overall perspective view of a footwear manufacturing apparatus which includes the improve adhesive masking system of this invention.
Figure 2:
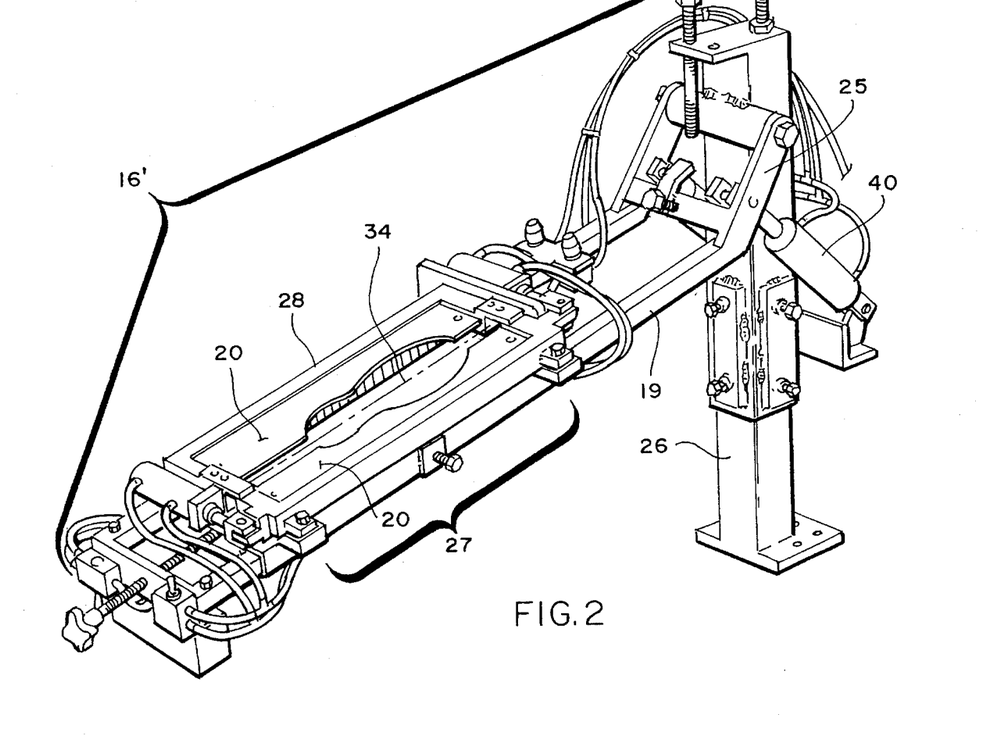
FIG. 2 is a perspective view of an improved adhesive masking system of the apparatus of FIG. 1.
Figure 3:
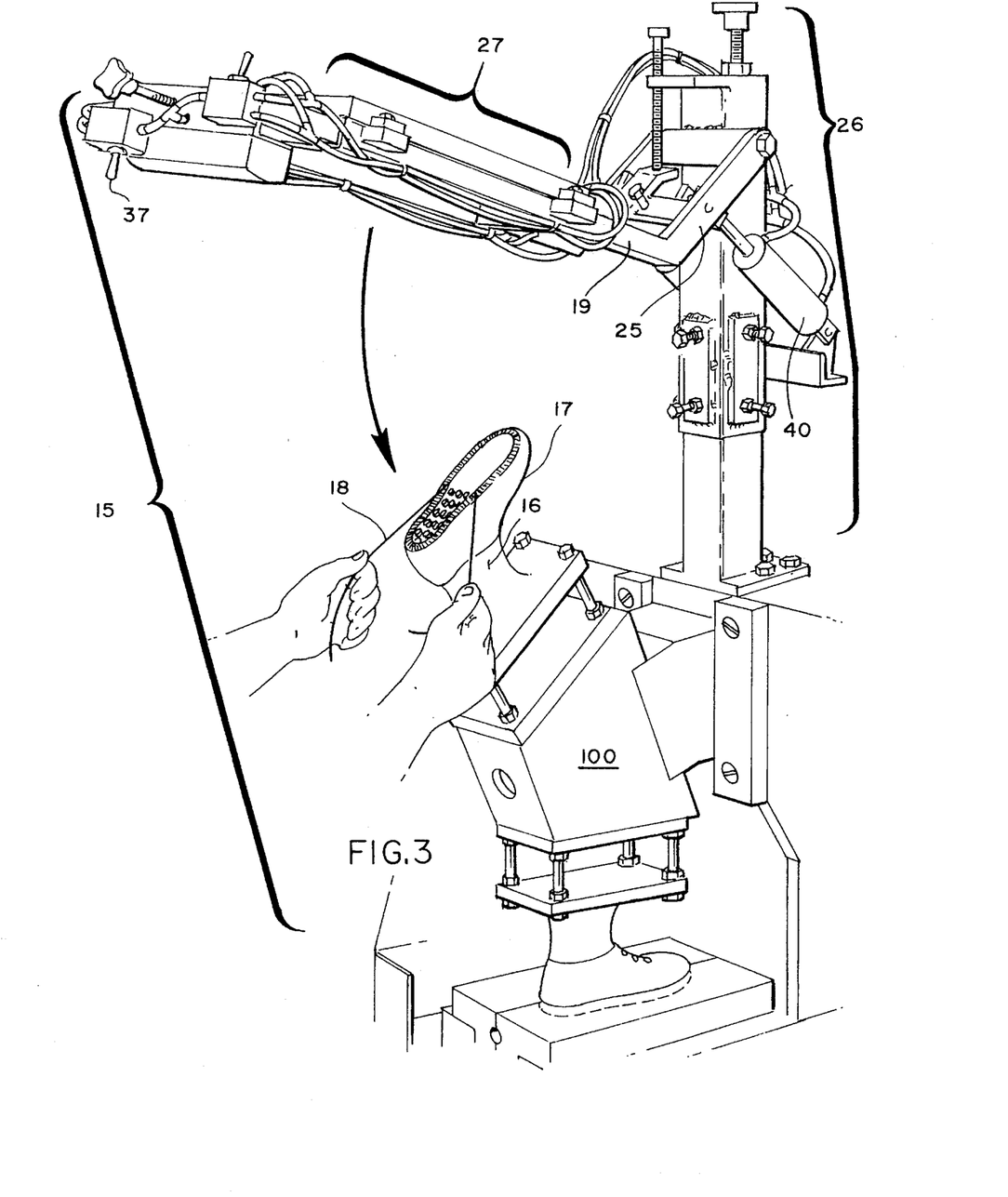
FIG. 3 is a perspective view of a workstation which includes the improved masking system and a last support.
Figure 4:
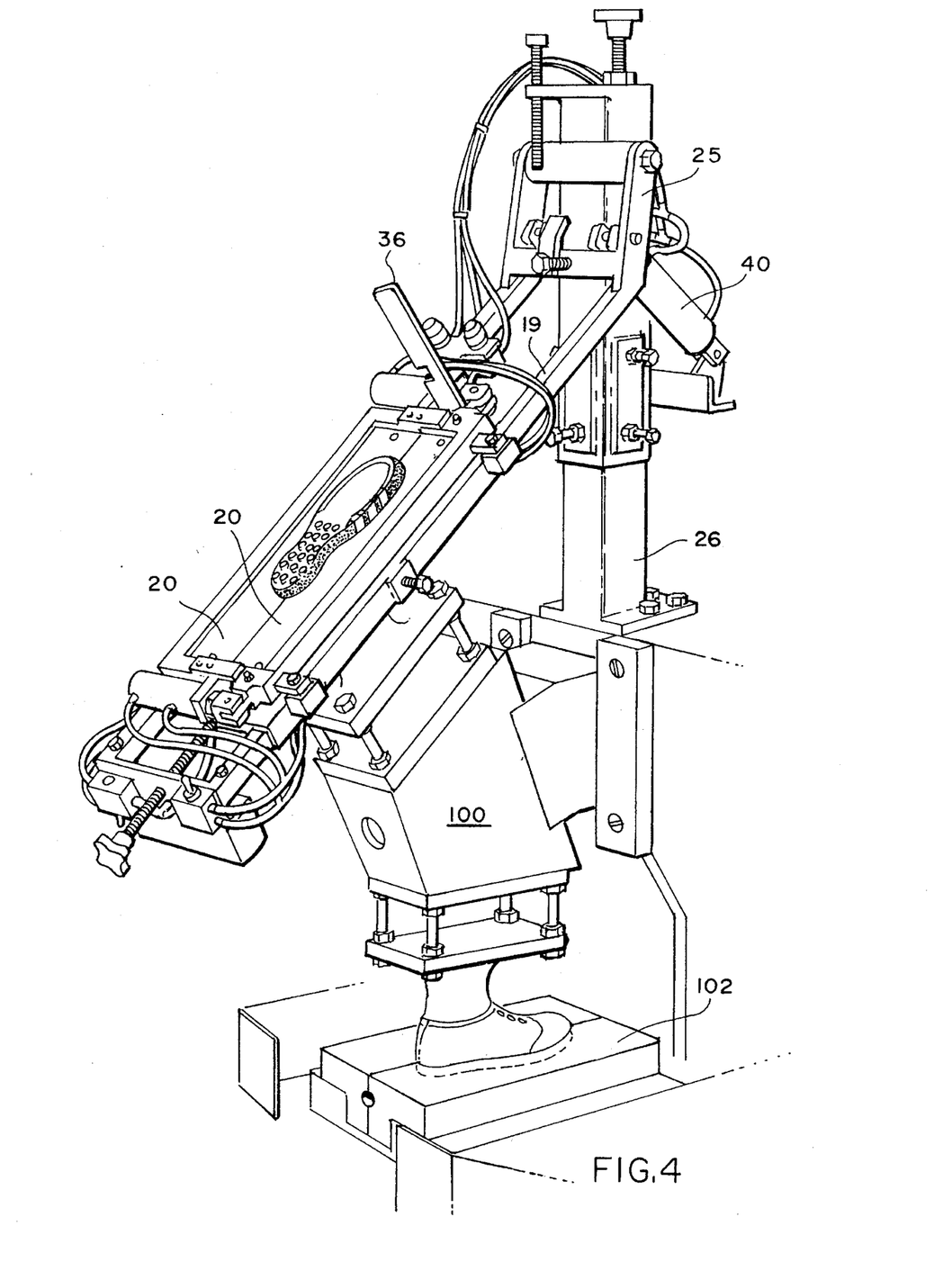
FIG. 4 is a perspective view of a workstation of FIG. 3, wherein the improved masking system is shown to have engaged an unfinished upper on a last; and, a ring mold engaged on another last of the same last support.

The carousel subassembly (12) of such equipment functionally resembles a wheel having a rotating platform (99) and a plurality of fixtures (100) that radiate from the rotating platform. The rotating platform is designed to couple with and engage a power drive assembly of the central post (13) of the stationery platform and thereby rotate about the axis of the central post (13) upon activation of the power drive assembly. As the rotating carousel moves about the vertical axis of the central post, each of the fixtures (100) of the carousel, and a workpiece supported at the end thereof, is moved in sequence about the central axis of the apparatus. The workpiece (17) (a footwear upper), as illustrated in FIG. 3, is initially placed upon a foot form or "last" (16) so as to position the sole-side up. A drawstring (18), sewn into the upper, is then pulled tightly so as to firmly secure the upper, in the inverted position, upon the last (16). The carousel then advances the workpiece to the next workstation for the application of a bonding agent to a delimited area of the upper prior to injection molding of the sole.

Figure 5A:
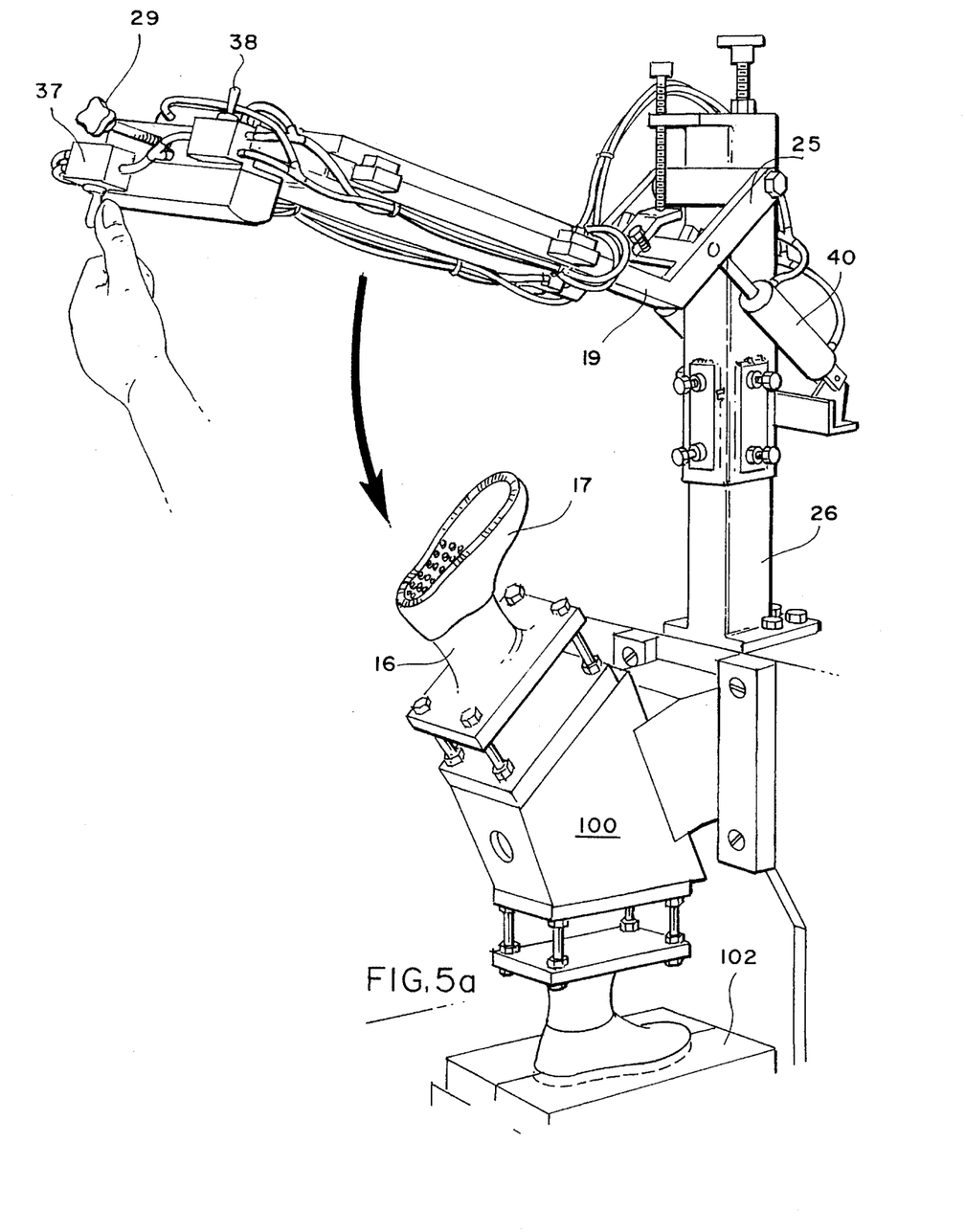
FIGS. 5(a) to 5(d) is a perspective view of a workstation wherein the masking system of this invention is shown relative to a workpiece at various stages of operation thereof.
Figure 5B:
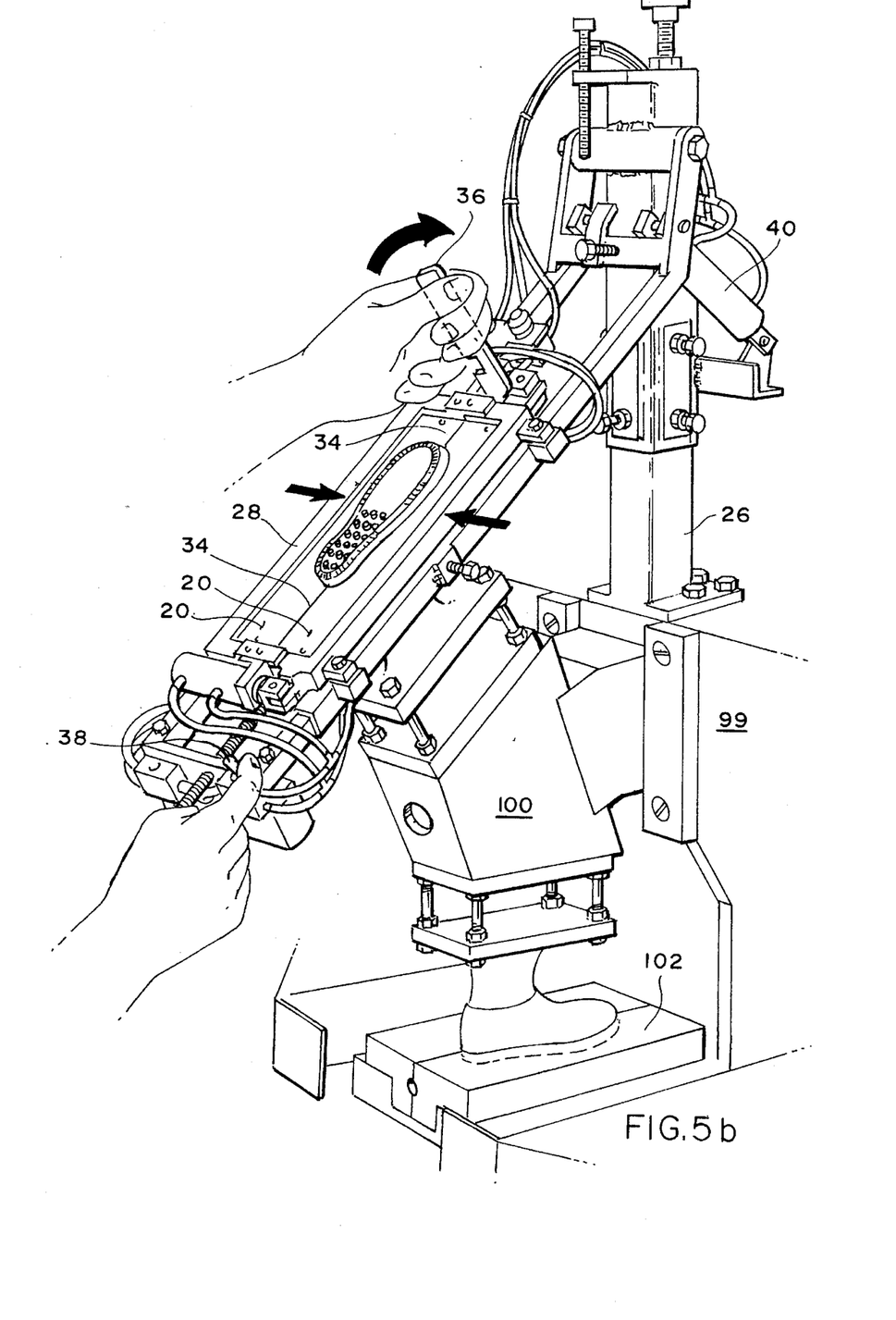

As more fully illustrated in the accompanying FIGS. 5(a) to 5(d), this process of application of the adhesive to the upper is accomplished, by first, activation of an armature (19) of the adhesive masking system which swings a two-piece mask (20) into proximate relation to the sole-side of the workpiece. As noted briefly above, this armature is supportive of a mask and can precisely position the mask relative to a unfinished upper. More specifically, as illustrated in FIG. 5(a) this armature is hinged or pivotally mounted at the proximal end (25) thereof to a vertical upright (26) of the rotating platform of the carousel The armature (19) is further provided with a series of pneumatically powered pistons (40), which upon activation thereof by a switch (37), cause the armature to move in an arcuate path of travel and thereby position the distal end thereof, as shown in FIG. 5(b), in proximate relation to the sole-side of an upper which is supported. upon a foot form or last. In the embodiment of the equipment illustrated in FIGS. 2, 3 and 5(a) to 5(d), the distal end (27) of the armature includes a frame (28) and a mask (20) supported within the frame (28). This frame includes an inside track or slot (not shown) adapted to receive and support a mask (20). The mask, in this embodiment of the invention, is a planar body having two complimentary sections, which, when assembled within the frame, and caused to meet at the mid-line (34), are designed to engage a workpiece (17) so as to isolate a delimited area thereof. This isolation of a delimited area of a workpiece by the mask permits the controlled application of an adhesive (60) to only that portion of the workpiece which is to be bound to the injection molded sole to the exclusion of other areas of the workpiece which remain independent of the sole. The reciprocating movement of each of the component parts of the mask (20) and the engagement with a workpiece (17) is accomplished by activation of a pair of travelers (not shown) associated with the frame (28) and which are coupled to each of the sections of the mask at the "toe" end of the mask and at the heel end of the mask. These travelers can be powered by a pair of pistons which effect the movement of the travelers within the track of the frame upon the activation of the controls which direct their operation.

In the preferred embodiments of this invention, the armature is semi-automated and, thus, designed to minimize operator involvement and yet requires sufficient operator involvement in the manipulation of the armature (19) relative to the workpiece to insure that the operator's hands and fingers are remote from the mask at the time of energizing the solenoids and the reciprocal movement of the mask relative to the workpiece. More specifically, in the embodiment illustrated in FIG. 5(b), the frame (28) is provided with a lever (36) which requires manual operation by the assembly worker to release a "safety" concurrent with manual operation of an electrical switch (38) with the assembly worker's other hand to effect the powered reciprocal movement (via pneumatic means) of each section of the mask within the frame.

Where the size of the footwear to be manufactured on a given piece of equipment is changed from, for example, an adult's size to a child's size, the size of the mask must also be altered accordingly to match the area of the upper that is to fit within the mask, and thereby correspond with the ring of mold of the injection cavity which is responsible for the forming of the sole. The frame of the armature is, thus, disassembled and the adult sized mask simply substituted by a child sized mask.

Upon placement of a different size mask within the frame of the armature, the frame and mask will be re-aligned relative to the smaller workpiece. This re-alignment of the frame relative to the workpiece is accomplished by a fine adjustment of the frame position through a series of vernier-like controls (29) associated with the frame (28) so as to insure that the arcuate movement thereof by the armature places the mask in proximate relation to the workpiece. The "set-up" for each mask size can be pre-calibrated in advance of actual operation of the equipment and, thus, the assembly worker can readily replace masks within the frame, as described above, and thereafter fine tune the positioning of the mask relative to the workpiece by simply dialing in a given setting in the vernier adjustment for a given size of mask.

Figure 5C:
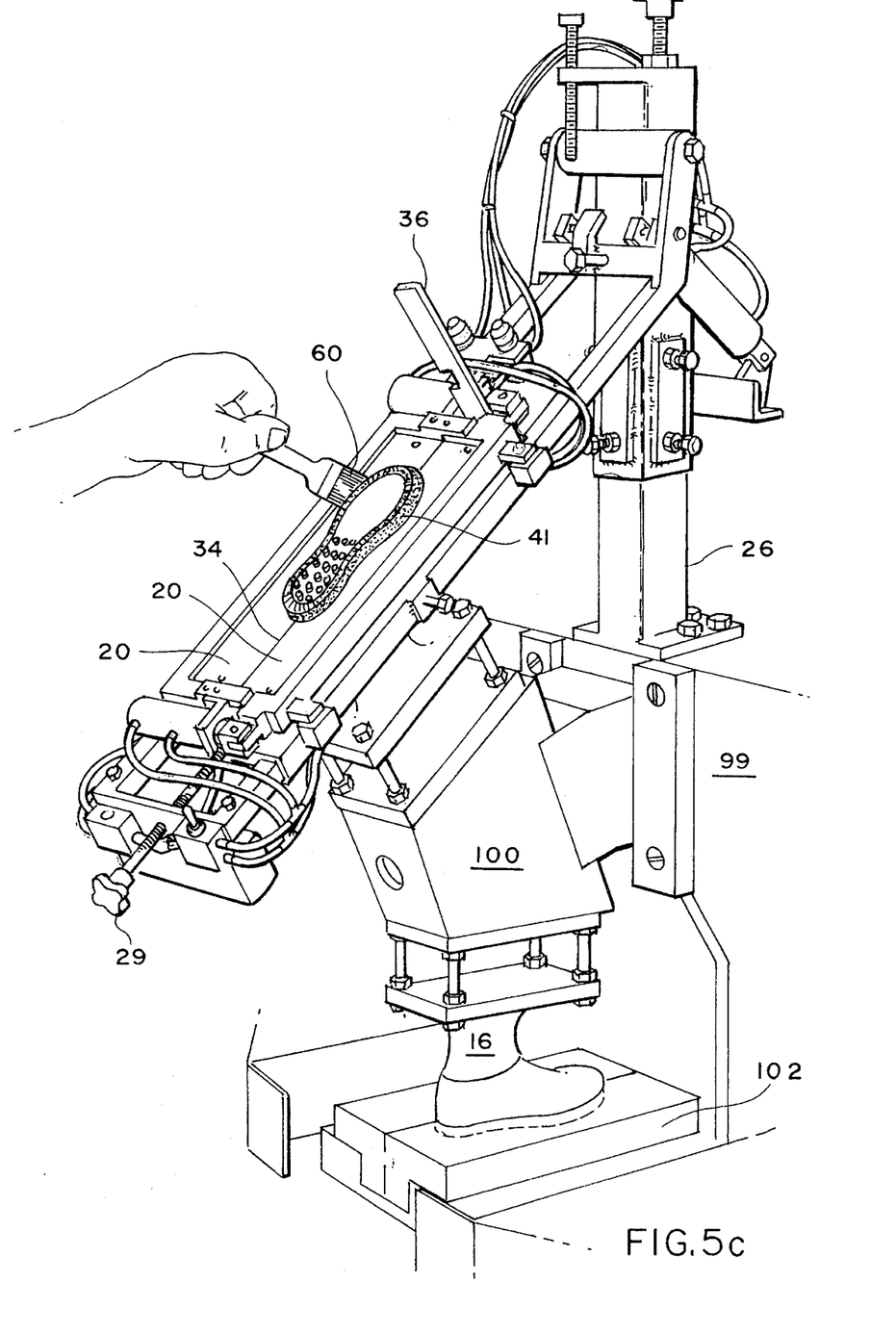
Figure 5D:
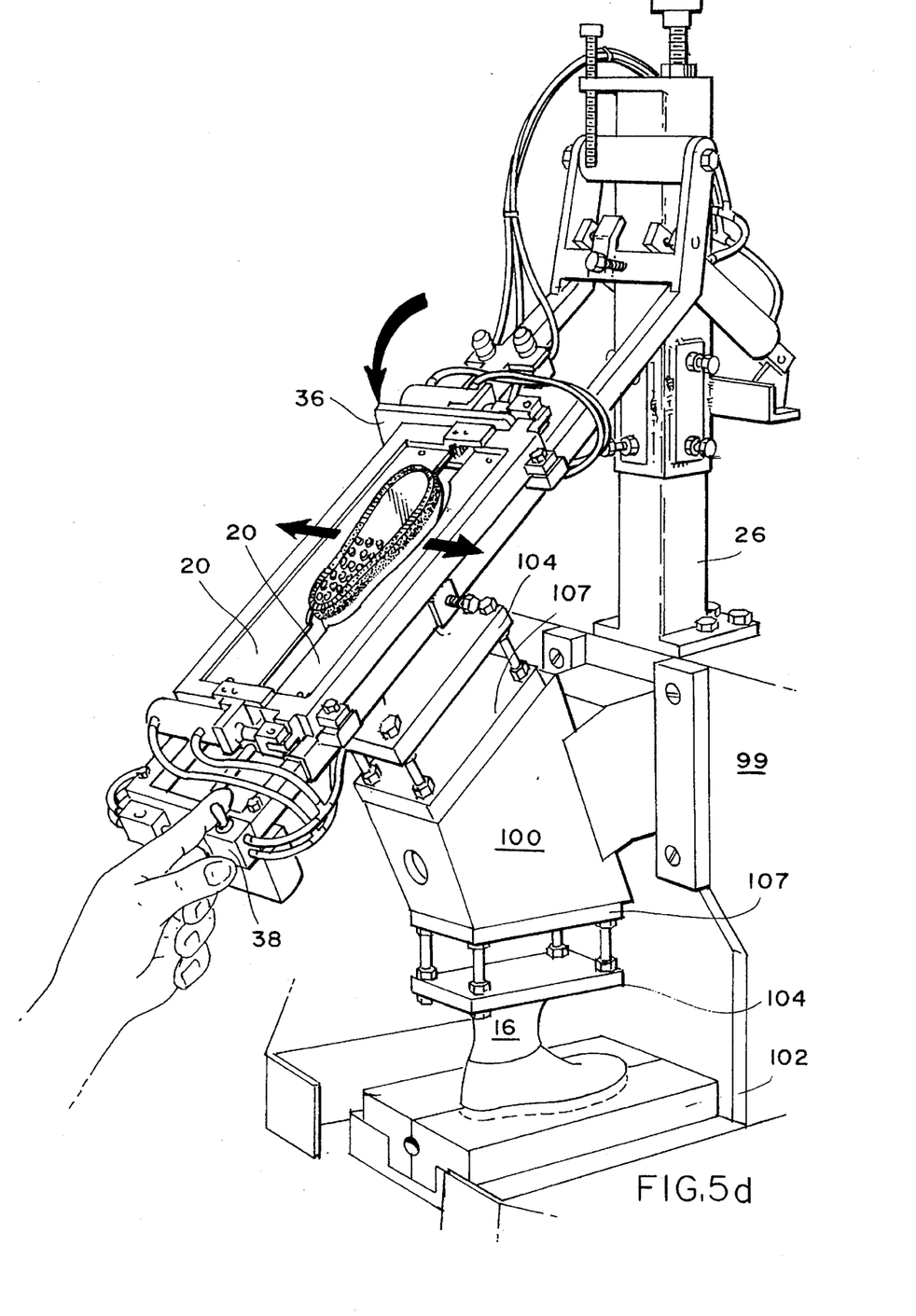

Subsequent to the engagement of the mask and the upper (FIG. 5(b)) so as to define a delimited area thereof, an assembly worker applies an adhesive or bonding agent (60) to such delimited area (41) of the upper (FIG. 5(c) & 5(d))and only to such delimited area. Because of the precision placement and power engagement of the mask relative to the upper, application of adhesive or bonding agent (60) is confined to only that portion of the upper which is to be bonded to the sole in the course of the injection molding of the sole to the upper. Upon completion of this step in the assembly process, the mask is opened (FIG. 5(d)) by operator activation of electrical switch (38) and, thus, the disengagement of the mask from the upper is effected. In the preferred embodiments of this invention, the mask is made from a material, or coated with a material, that is not wetted by the adhesive or bonding agent used in the assembly process thereby avoiding the build-up thereof on the mask. Once the mask is opened, the arcuate movement of the armature is reversed and the distal end of the armature, including the frame and the mask, is caused to swing upward and away from the workpiece. The above workpiece is now moved to the next workstation upon the rotation of the carousel assembly and the above adhesive application process repeated upon another workpiece.

As noted above, each of the foot forms or last (16) is supported upon a fixture (100) mounted to the carousel and it is the rotational movement of this carrousel which effects the sequential movement of the workpiece from one workstation to another. In the preferred embodiments of this invention, the carousel supports an array of lasts from a series of posts that are attached to a centrally located platform that is mounted to and driven by a motor operatively associated with a power drive assembly of a centrally located post of the equipment frame. This array of fixtures (100) resemble a series of spokes which radiate laterally from the platform. Each of theses fixtures is further provided on the terminus thereof with means (107) for mechanical coupling to a last (16). In the preferred embodiment of this invention, the mechanical design of choice includes a last support assembly a plate (104) for mechanically coupling the last to a fixture (100) that is pivotally mounted to the rotating platform of the carousel. Each of the pair of lasts is mounted to a common fixture (100) by a pair of mounting plates, oppositely disposed relative to each other, and to each of the mating surfaces of the common fixture. Thus, each of the fixtures (100) can accommodate a plurality of lasts and the coupling of the fixture to the rotating platform of the carousel permits the articulation or rotation of said fixture relative thereto so as to permit the alternating movement of one last and then the other into operative relation to a workstation (15) at the appropriate stage of the manufacturing cycle. More specifically, at the end of each adhesive application phase of the manufacturing cycle, the fixture (100) is rotated 180° relative to the rotating platform of the carousel so as to position the upper and last relative to a mold (102) of the injection molding subassembly (14) of such equipment; and, another last of such carousel assembly relative to a workstation (15) for fitting on an unfinished upper (17) as the operating cycle of the equipment is repeated. The completed footwear is subsequently removed from the last by one of the operators involved in the manufacturing process as it passes by his workstation (15). This delay in removal of the finished goods allows additional time for the resin to set in the sole mold before mold separation and the removal of the sole from the mold cavity. The advantage afforded by such arrangement is apparent in that it permits continuous operation of the equipment carousel, even when the injection molded component of the footwear is uncured or green and, thus, cannot be removed from the last for a finite period which may exceed the period of time it takes the carousel to complete one complete revolution.

Figure 6:
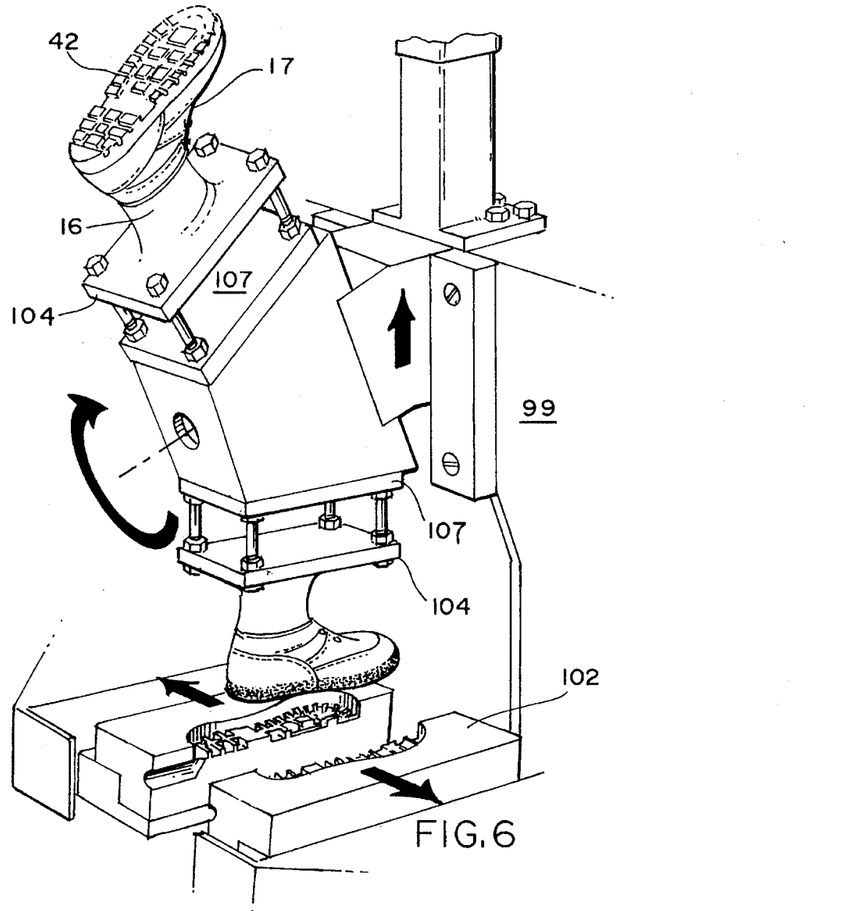
FIG. 6 is an enlarged perspective view showing the inversion of the last of FIG. 5 and its placement of the unfinished upper in a rim mold for injection molding of a sole.

The injection molding subassembly (14) illustrated in FIG. 6 includes a ring mold (102) which mechanically engages the upper (17) at pre-defined position on the upper. As more fully illustrated in FIGS. 1 & 6, upon rotational movement of the carousel and the inversion in the position of the last relative to its supporting post on the carousel, the upper (17) is positioned relative to a ring mold (102) of the injection molding subassembly (14). The placement of the upper relative to the ring mold is commensurate with the extent of adhesive or bonding agent on the delimited area of footwear upper. Once the upper is positioned relative to the mold, the mold is closed and sealed about the upper, the injection molding of resin into the mold is effected and the mold allowed to remain engaged to the last until the resin has set sufficiently to permit its disengagement from the last. Where such interval exceeds the cycling interval of movement of the last between the workstation (15), the mold is allowed to remain engaged to the last until the resin has sufficiently set onto the upper.

Figure 7:
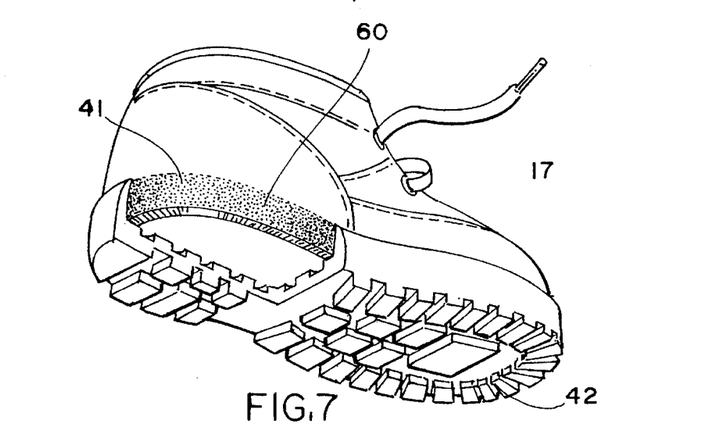
FIG. 7 is a perspective view, in partial section of footwear manufacture in accordance with the footwear manufacturing apparatus.

FIG. 7 simply illustrates in partial section the resulting footwear, specifically, the placement of the adhesive (60) relative to the injection molded sole (42), and the absence of any adhesive upon the surface of the upper that can detract from the appearance of the finished goods.

The above description of the invention has been made in reference to the preferred embodiments thereof and is not intended as a delineation of the scope thereof, which is set forth in the following claims.

What is claimed is:

1. An apparatus for the manufacture of goods wherein a component is injection molded in respect to a workpiece so as to effect formation of an essentially complete, permanent and uniform, blemish-free seal between said injection molded component and said, wherein the apparatus comprises:

a. means for the precision placement of a mask in respect to a workpiece, said precision placement means comprising an armature which includes a proximal end and a distal end, said proximal end being pivotally mounted to a fixed or stationary body by an articulating coupling so as to permit arcuate movement of said distal end thereof into operative relation to said workpiece so as to effect placement of a mask in proximate relation to said workpiece, said distal end comprising a frame having said mask supported in a track of said frame;

b. said mask comprising essentially two sections, each section thereof defining a portion of an open area of said mask and being maintained at a defined distance from each other in said frame;

c. means for effecting relative movement of each of said sections of said mask in said track toward one another upon application of an energizing signl, and;

d. means for energizing said mask comprising a release mechanism to allow for movement of each of said sections of said mask within said frame and switching means for activation of said sections to effect relative movement of said sections and engagement of said sections with said workpiece to create a delimited area on said workpiece so as to confine said delimited area of said workpiece within said mask and thereby permit application of an adhesive to said delimited area and to only said delimited area, said delimited area conforming with a ring mold used to injection mold a plastic component relative to said workpiece.

2. The apparatus of claim 1, wherein said workpiece is a footwear upper supported upon a last and wherein said open area of said mask conforms in overall dimension to a sole of said footwear upper.

3. The apparatus of claim 2, wherein the each of said sections of said mask defines the open area equivalent to approximately 50% of said sole.

4. The apparatus of claim 1, wherein said apparatus further comprises a rotating carousel having a plurality of workstations thereon where each workstation has a post that extends radially from a centrally located platform that is operatively associated with said carousel, said post having at least one last thereon so as to effect sequential movement of said last with respect to the said workstations.

5. The apparatus of claim 1, wherein each of said release mechanism and said switching means are physically remote from the other such that said mechanism and said switching means require concurrent manual operation to effect the desired relative movement of the sections of the mask within said frame and the engagement of said mask with said workpiece.

6. In a rotating carousel having a stationary base where said carousel has a plurality of workstations radiating therefrom, said workstations comprising an apparatus for the manufacture of goods wherein a component is injection molded in respect to a workpiece component so as to effect formation of an essentially complete, permanent and uniform, blemish-free seal between said injection molded component and said workpiece, wherein the improvement comprises:

a. means for the precision placement of a mask in respect to said workpiece, said precision placement means comprising an armature which includes a proximal end and a distal end, said proximal end being pivotally mounted to a fixed or stationary body by an articulating coupling so as to permit arcuate movement of said distal end thereof into operative relation to said workpiece so as to effect placement of said mask in proximate relation to said workpiece, said distal end comprising a frame having said mask supported in a track of said frame;

b. said mask comprising essentially two sections, each section thereof defining a portion of an open area of said mask and being maintained at a defined distance from each other in said frame;

c. means for effecting relative movement of each of said sections of said mask in said track toward one another upon application of an energizing signal, and;

d. means for energizing said mask comprising a release mechanism to allow for movement of each of said sections of said mask within said frame and switching means for activation of said sections to effect relative movement of said sections and engagement of said sections with said workpiece to create a delimited area on said workpiece so as to confine said delimited area of said workpiece within said mask and thereby permit application of an adhesive to said delimited area and to only said delimited area, said delimited area conforming with a ring mold used to injection mold a plastic component relative to said workpiece.

\* \* \* \* \*